United States Patent
Rader et al.

(10) Patent No.: US 6,794,926 B2
(45) Date of Patent: Sep. 21, 2004

(54) CHARGE PUMP WITH CURRENT LIMITING CIRCUIT

(75) Inventors: William E. Rader, Carrboro, NC (US); David P. Keesor, Durham, NC (US)

(73) Assignee: Semtech Corporation, Morrisville, NC (US)

( * ) Notice: Subject to any disclaimer, the term of this patent is extended or adjusted under 35 U.S.C. 154(b) by 0 days.

(21) Appl. No.: 10/313,462

(22) Filed: Dec. 5, 2002

(65) Prior Publication Data

US 2003/0085752 A1 May 8, 2003

Related U.S. Application Data

(62) Division of application No. 09/717,769, filed on Nov. 21, 2000, now Pat. No. 6,504,422.

(51) Int. Cl.⁷ .................................................. G05F 3/02
(52) U.S. Cl. .......................... 327/536; 327/534; 363/60
(58) Field of Search ................................ 327/539, 536, 327/537; 363/60

(56) References Cited

U.S. PATENT DOCUMENTS

| | | | | |
|---|---|---|---|---|
| 5,111,375 A | * | 5/1992 | Marshall | 363/60 |
| 5,132,895 A | * | 7/1992 | Kase | 363/60 |
| 5,185,721 A | * | 2/1993 | Love et al. | 365/189.06 |
| 5,521,871 A | * | 5/1996 | Choi | 365/189.11 |
| 5,532,916 A | * | 7/1996 | Tamagawa | 363/62 |
| 6,021,056 A | * | 2/2000 | Forbes et al. | 363/60 |
| 6,031,411 A | * | 2/2000 | Tsay et al. | 327/536 |
| 6,046,626 A | * | 4/2000 | Saeki et al. | 327/536 |
| 6,225,854 B1 | * | 5/2001 | Cha | 327/536 |
| 6,226,193 B1 | * | 5/2001 | Bayer et al. | 363/59 |

* cited by examiner

Primary Examiner—Terry D. Cunningham
(74) Attorney, Agent, or Firm—Coats & Bennett, P.L.L.C.

(57) ABSTRACT

A charge pump power supply includes two or more modes of operation. An input protection circuit is connected between an input of the power supply and a voltage source. The input protection circuit regulates the voltage at the input of the power supply, limits current at the input when switching from a weaker mode to a stronger mode, and prevents current reversal when switching from a stronger mode to a weaker mode. In some modes, the power supply continuously provides current to the load, obviating the need for an output capacitor.

1 Claim, 6 Drawing Sheets

CHARGE PUMP WITH CURRENT LIMITING CIRCUIT

This is a division of Application Ser. No. 09/717,769, filed Nov. 21, 2000 now U.S. Pat. No. 6,504,422.

FIELD OF THE INVENTION

The present invention relates to switching power supplies, and more particularly, to a charge pump switching power supply with voltage regulation at its input.

BACKGROUND OF THE INVENTION

Portable electronic devices are ubiquitous, and are increasing in both number and diversity. Examples include cellular telephones, personal digital assistants (PDAs), portable computers, portable tape/CD/MP3 players, hand-held televisions, and the like. These portable devices are generally powered by a battery, which may be rechargeable, such as nickel cadmium, nickel metal hydride, or lithium ion, or which may be of a single-use type, such as conventional alkaline cells. All of these batteries lose their charge over time, and consequently do not produce a single, constant voltage output.

To simplify the design of the electronics operating on battery power, the time-varying output voltage of the battery must be stabilized, or regulated, to a constant, predetermined value. In particular, as the battery charge decays, its output voltage may fall below the required operating voltage of the electronics, necessitating a "boost," or increase of the battery's voltage. One way to boost an input voltage, such as that from a battery, to a higher output voltage is by use of a type of switching power supply known generally in the art as a charge pump. A charge pump typically contains one or more charge storage capacitors, also known in the art as bucket capacitors or boost capacitors, whose interconnection configuration relative to the input and output nodes and a circuit ground is configurable via a network of switches.

A charge pump is often preferable to a linear voltage regulator as a power source for electronics due to its efficiency, and its ability to boost voltages from input to output. A charge pump may be preferred over a switched mode power supply based on reactive elements due to its ease of use, relatively low noise, and lower cost. Factors that have prevented the widespread use of traditional charge pumps as previously known in the art include poor efficiency and limited output load current.

SUMMARY OF THE INVENTION

The present invention relates to a type of switching power supply generally known in the art as a charge pump. The switching power supply is connected in series between a power source, such as a battery, and a load to provide a generally constant output voltage to the load. The switching power supply comprises a switching circuit, a control circuit, and an input protection circuit. The switching circuit comprises a network of switches and charge storage capacitors, also known in the art as bucket capacitors. The switches of the switching circuit are selectively actuated under the direction of the control circuit to charge and discharge capacitors within the switching circuit to provide a regulated voltage at the output of the switching circuit. The regulated output voltage is fed back to the control circuit, which controls the operation of the switching circuit. The control circuit compares the output voltage with a reference voltage and generates a signal that controls the operation of the switching circuit. The input circuit has a plurality of modes that provide different ratios of input to output voltage.

An input circuit is connected in series between the power source and the input of the switching circuit. The input circuit serves three functions: 1) to prevent voltage breakdown of the switches in the switching circuit; 2) limiting currents from the power supply during switching transitions; and 3) preventing current reversal through the input of the switching circuit during switching transitions.

DETAILED DESCRIPTION OF THE INVENTION

Figure 1:
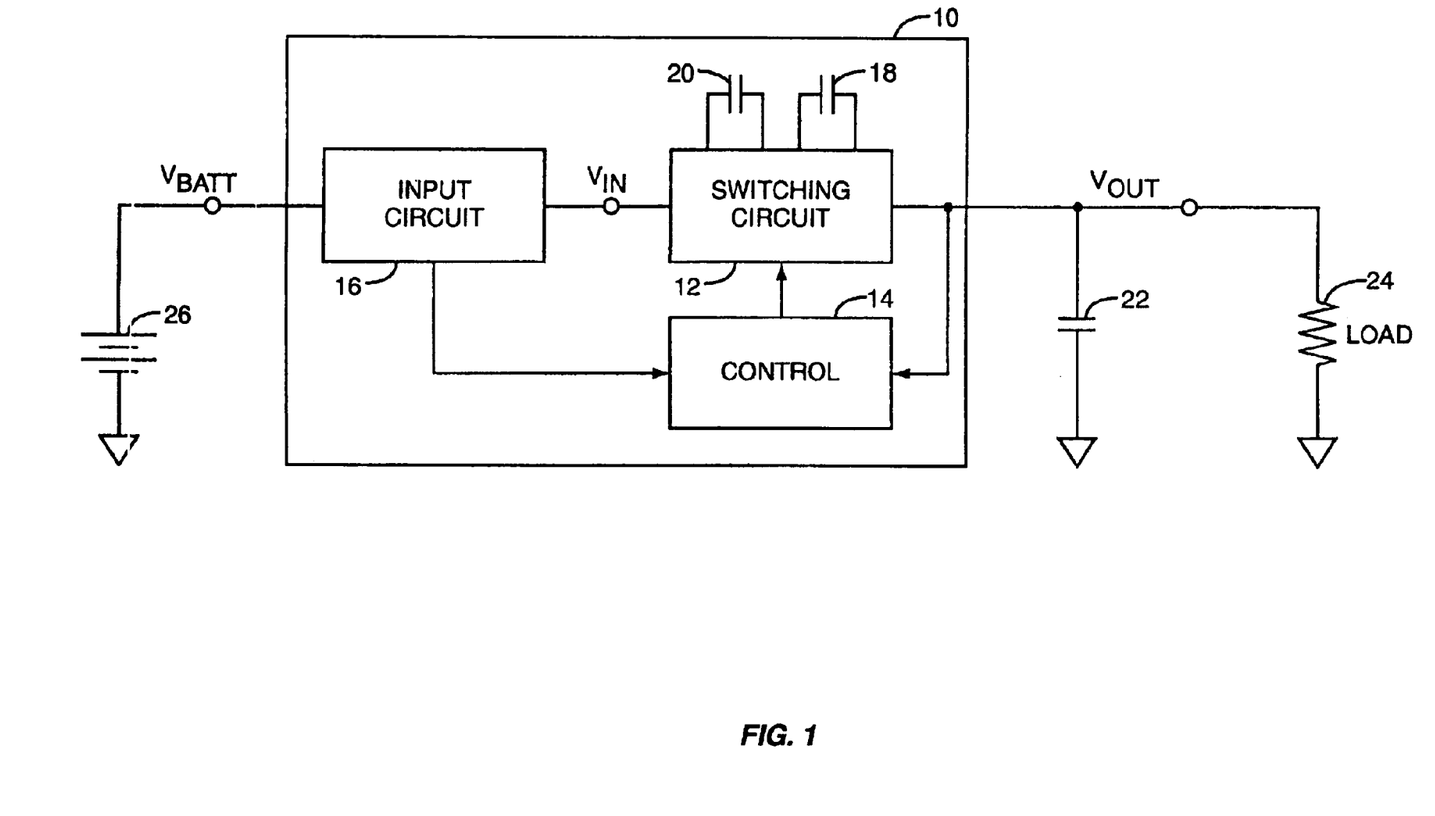
FIG. 1 is a block diagram depicting the charge pump in a typical circuit.

The present invention relates to a type of switching power supply generally referred to in the art as a charge pump or switched capacitor circuit. The switching power supply is connected in series between a power source 26, such as a battery, and a load 24 to provide a generally constant output voltage to the load. A block diagram of an exemplary switching power supply, denoted generally by the numeral 10 is shown in FIG. 1.

The switching power supply 10 comprises a switching circuit 12, control circuit 14, and input circuit 16. The function of the switching circuit 12 is to provide an input voltage, denoted $V_{OUT}$, at an output of the switching circuit 12 that is derived from a regulated input voltage, denoted $V_{IN}$, that varies between selected voltage levels. Switching circuit 12 comprises a network of switches and charge storage capacitors, also known in the art as bucket capacitors or boost capacitors. The switches of the switching circuit 12 are selectively actuated under the direction of the control circuit 14 to charge and discharge capacitors within the switching circuit to provide a regulated voltage at the output of the switching circuit. The regulated output voltage $V_{OUT}$ is fed back to the control circuit 14, which controls the operation of the switching circuit 12. Control circuit 14 compares the output voltage $V_{OUT}$ with a voltage reference and generates a pulse train that switches the switching circuit 12 between phases. Input circuit 16 is connected in series between the power source 26 and the switching circuit 12.

Figure 2:
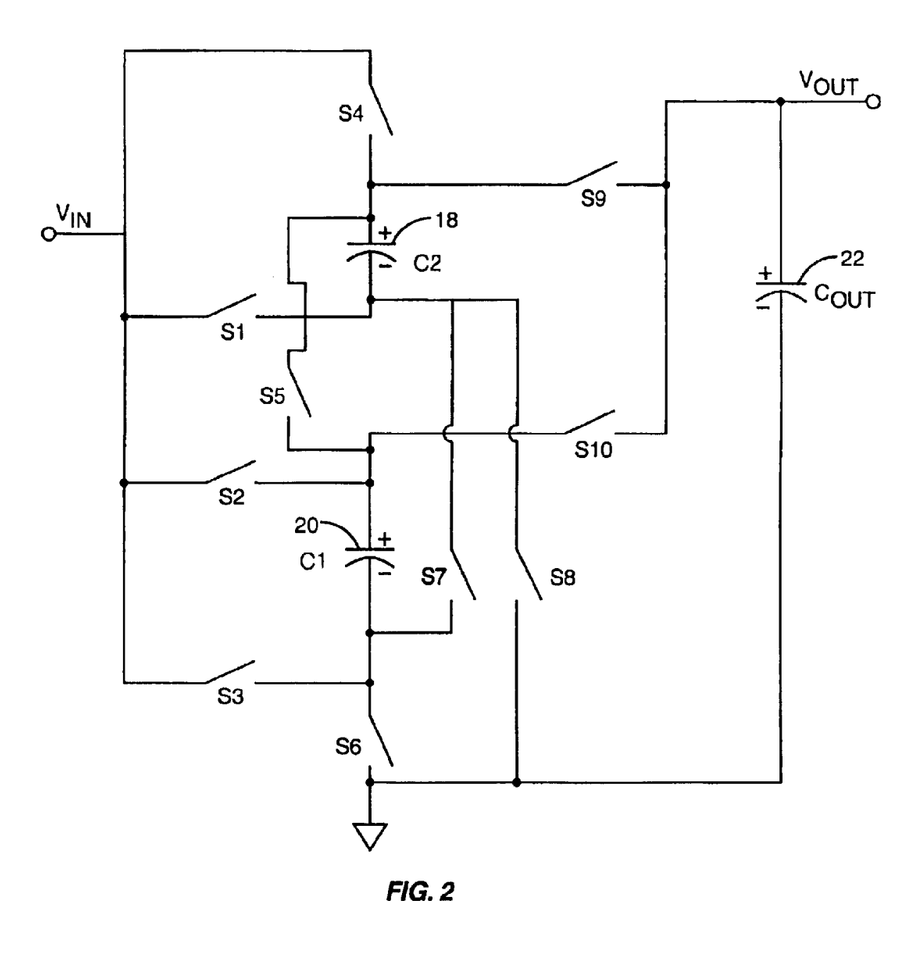
FIG. 2 is a circuit schematic depicting one embodiment of a switching circuit according to the present invention.

FIG. 2 depicts one exemplary embodiment of the switching circuit 12. The switching circuit 12 comprises two charge storage capacitors C1 and C2 and a plurality of switches S1–S10. The switching circuit 12 depicted in FIG. 2 may in general be implemented in a wide variety of ways. In one embodiment particularly suited to portable electronics applications, the switching network comprising switches S1–S10 are implemented on an integrated circuit, with the various switches comprising transistors, as well known in the art. Charge storage capacitors C1 and C2 are mounted off chip, as is output capacitor 22, also referred to herein as $C_{OUT}$.

The various switches S1–S10 of the switching circuit 12 may be selectively actuated to configure charge storage capacitors C1 and C2 in a plurality of different configurations or circuit topologies with respect to the voltage input and output nodes $V_{IN}$ and $V_{OUT}$, respectively, and with respect to the circuit ground. For purposes of this application, the various configurations of the switching circuit 12 will be described by reference to modes and phases. The term mode refers to a set or group of configurations that collectively produce a fixed gain or ratio of output to input voltage. For example, the switching circuit of the exemplary embodiment comprises a 1× mode, 1.5× mode, a 2× mode, and a 3× mode. During each mode (with the exception of the 1× mode), the capacitors C1 and C2 may be switched between two or more configurations in which they are alternately charged by the input voltage and discharged to the output. In this way, electrical charge is "pumped" from the input node to the output node. These repetitive switched configurations within a mode are referred to as "phases" of the given mode of operation. Thus, as used herein, the term mode refers to a specific repetitive sequence or cycle of phases that cooperatively function to produce a regulated output voltage at a unique gain or ratio of output voltage to input voltage. The term phase refers to the circuit configurations that are the constituent cycles or elements of a mode. Each gain mode comprises at least two phases (the 1× mode comprises only one phase), and a given implementation of switching circuit 12 may comprise more than one mode.

Figure 3A:
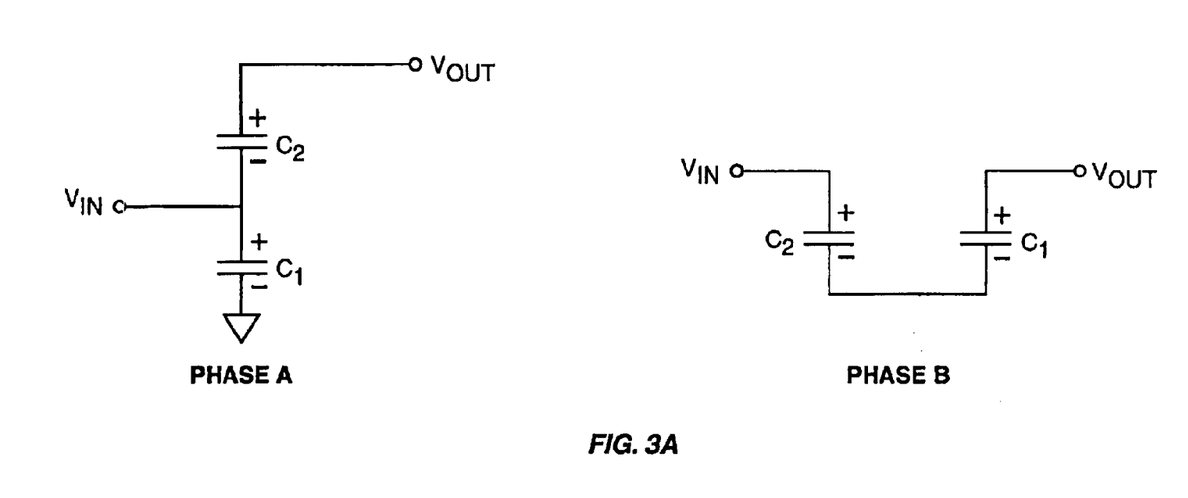
FIG. 3a depicts circuit schematics of an improved 1.5× mode of a charge pump, in two phases.
Figure 3B:
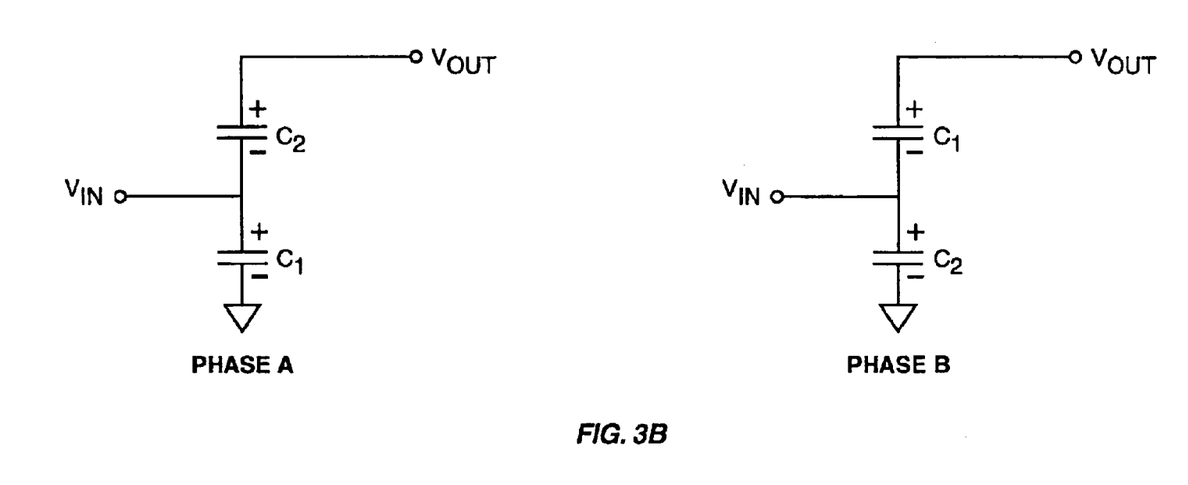
FIG. 3b depicts circuit schematics of a 2× charge pump, in two phases.

FIGS. 3A and 3B illustrate in simplified form some of the modes and phases of the switching circuit 12. The state of switches S1–S10 in each of the modes and phases is shown in Table 1 below:

TABLE 1

| | Switch Configurations (closed switches) | | | |
| --- | --- | --- | --- | --- |
| | Mode | | | |
| Phase | 3x | 2x | 1.5x | 1x |
| Charge (Phase A) | S1, S2, S6, S9 | S1, S2, S6, S9 | S1, S2, S6, S9 | S4, S9, S2, S10, S6, S8 |
| Pump (Phase B) | S3, S5, S8, | S3, S4, S8, S10 | S4, S7, S10 | S4, S9, S2, S10, S6, S8 (same as Phase A) |

In Table 1, the columns represent various modes and the rows represent distinct phases (with the exception of 1× mode). The switches designated in Table 1 are those that are closed during the designated phase.

FIG. 3A depicts the phases of the switching circuit in 1.5× mode. In 1.5× mode, switching circuit 12 switches between the configurations denoted as phase A and phase B to generate an output voltage $V_{OUT}$ that is 1.5 times the input voltage $V_{IN}$. In phase A configuration, capacitor C1 is connected between $V_{IN}$ and ground, while capacitor C2 is connected between $V_{IN}$ and $V_{OUT}$. In phase B configuration, capacitors C1 and C2 are connected in series with opposite polarity between $V_{IN}$ and $V_{OUT}$. That the gain is 1.5 may be shown mathematically as follows, assuming no load on the output, that the capacitors have charged/discharged to a steady state, and no voltage drop across the switches. For the purpose of the following equations, $V_{C1}$ and $V_{C2}$ are the voltages across capacitors C1 and C2, respectively. By inspection of phase A of FIG. 3A, it is apparent that the voltages across the capacitors C1 and C2 are:

$$V_{C1}=V_{IN} \tag{1}$$

$$V_{C2}=V_{OUT}-V_{IN} \tag{2}$$

When the switches of switching circuit 12 are configured so as to produce the circuit relationship of Phase B, the following relationship is observed (particularly noting that C1 and C2 are connected in series in opposing polarity, i.e., the negatively charged side of each capacitor shares a node):

$$V_{OUT}-V_{IN}=V_{C1}-V_{C2} \tag{3}$$

Substituting from (1) and (2) into (3), $$V_{OUT}-V_{IN}=V_{IN}-(V_{OUT}-V_{IN}) \tag{4}$$

$$2V_{OUT}=3V_{IN} \tag{5}$$

$$V_{OUT}=\frac{3}{2}V_{IN} \tag{6}$$

FIG. 3B depicts the phases of the switching circuit 12 in 2× mode. In 2× mode, switching circuit 12 switches between the configurations also denoted as phase A and phase B to generate an output voltage $V_{OUT}$ that is 2 times the input voltage $V_{IN}$. In phase A configuration, capacitor C1 is connected between $V_{IN}$ and ground, while capacitor C2 is connected between $V_{IN}$ and $V_{OUT}$. It should be noted that phase A in 2× mode is identical to phase A in 1.5× mode. In phase B configuration, capacitor C2 is connected between $V_{IN}$ and ground, while capacitor C1 is connected between $V_{IN}$ and $V_{OUT}$. That the circuits of FIG. 3B generate a 2× gain is shown mathematically as follows, using an analysis similar to that above. Indeed, for Phase A, the equations are the same:

$$V_{C1}=V_{IN} \tag{7}$$

$$V_{C2}=V_{OUT}-V_{IN} \tag{8}$$

Considering Phase B, the opposite is true:

$$V_{C1}=V_{OUT}-V_{IN} \tag{9}$$

$$VC_{C2}=V_{IN} \tag{10}$$

Substituting from (8) into (10)

$$V_{OUT}-V_{IN}=V_{IN} \tag{11}$$

$$V_{OUT}=2V_{IN} \tag{12}$$

Although switched mode charge pumps are referred to in the art as DC—DC power supplies, the output is not strictly DC. Due to the switching between phases and consequent charging and discharging of the charge storage capacitors C1 and C2, an AC component, called the "ripple," is superimposed on the DC output. The ripple is an inherent characteristic of switch mode power supplies. Most charge pumps known in the art strictly separate the two or more phases into charge and discharge phases. That is, all of the charge storage capacitors are charged from the input voltage during the first phase of operation and then discharged to the output during the second phase. Thus, there is no current supplied to the output during the charging phase. This mode of operation exacerbates the ripple component of the output. In contrast, in the charge pump modes depicted in FIGS. 3A and 3B, current is continuously supplied to the output during both phases. This not only reduces the ripple, but also allows the charge pump to be operated in such modes without the output capacitor 22 connected.

As used herein, a "continuous" supply of current denotes that current flows from a charge storage capacitor to the output during each active or operative phase. As will be appreciated by those of ordinary skill in the art, in switching between the phases, i.e., switching the configuration of capacitors relative to the input and output nodes, avoiding overlap of the switch actuation is important to prevent charge leakage or short circuit conditions. Hence, in a given application, the switching controls may be designed to effect "break before make" switch actuation, i.e., switches that isolate nodes are opened prior to the switches connecting nodes being closed. This may result in brief transients while switching between phases when current is not supplied to the output. As used herein, such current would still be considered "continuous" if it is supplied to the output during all phases of the charge pump.

Figure 4:
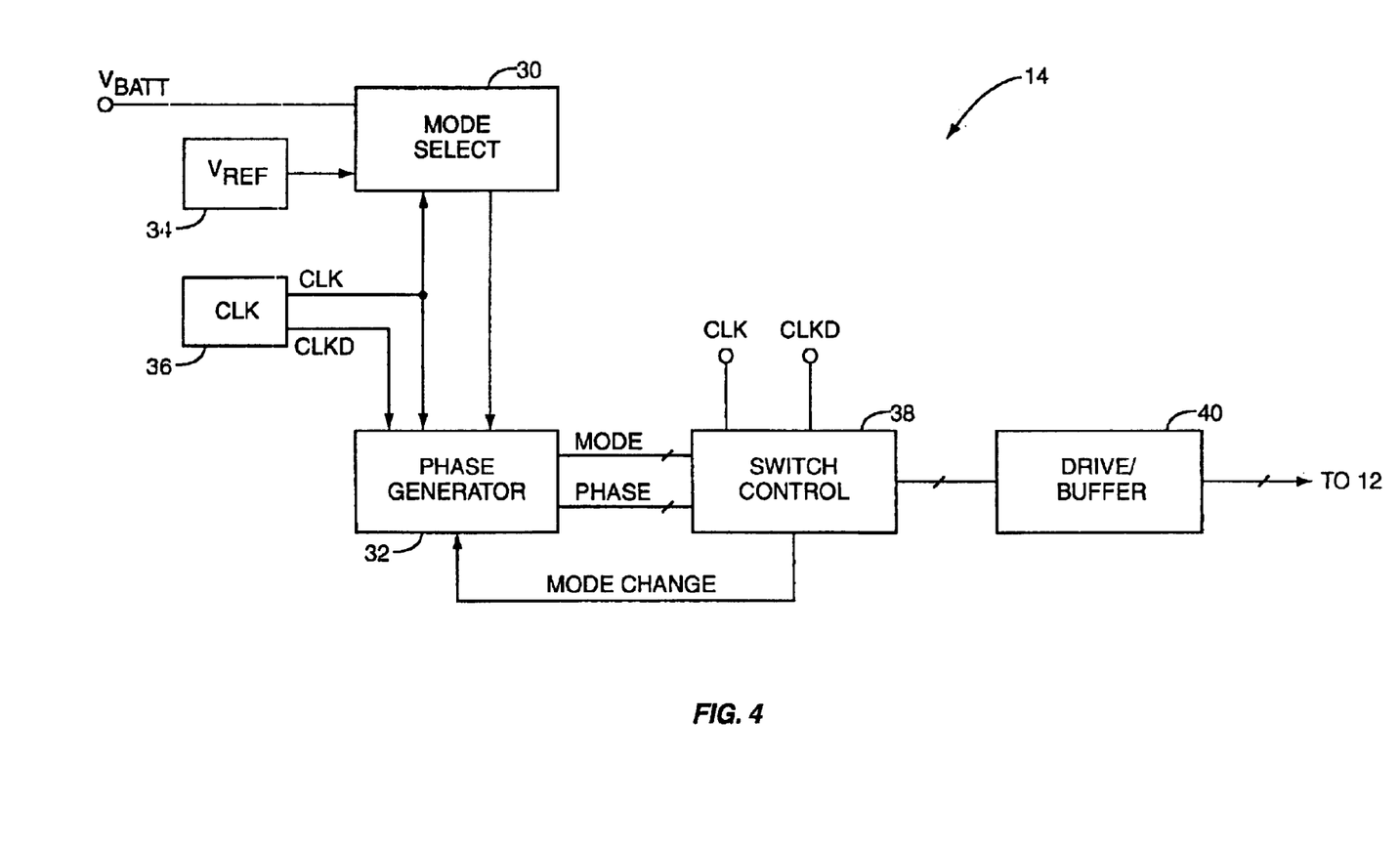
FIG. 4 is a block diagram of the control circuit for a charge pump.

FIG. 4 is a functional diagram of the control circuit 14. The control circuit 14 controls actuation of the switches S1–S10 in the switching circuit 12. The control circuit 14 comprises a mode selection circuit 30, a phase generator 32, a voltage reference 34, a clock 36, a switch control circuit 38, and a switch buffer circuit 40.

The mode selection circuit 30 determines the operating mode of the charge pump 10, based on comparing the supply voltage, $V_{BATT}$, with a reference voltage provided by the voltage reference 34. As will be explained in more detail later, overall efficiency of the charge pump 10 increases based on the mode selection circuit 30 choosing an operating mode appropriate to the actual supply voltage and load. The mode selection circuit 30 provides a mode selection signal to the phase generator 32, with both the phase generator 32 and the mode selection circuit 30 being clocked synchronously by the clock 36. The clock 36 provides a periodic clock signal CLK and a delayed version of the CLK signal, referred to as CLKD. Both CLK and CLKD are used by various logic circuits comprising the control circuit 14.

The phase generator 32 provides the switch control circuit 38 with mode and phase signals that the switch control circuit 38 uses to control which switches are actuated in the switching circuit 12, and in what sequence those switches are actuated. Thus, the phase generator 32 implements the switching sequences in the switching circuit 12 that define the mode of operation selected by the mode selection circuit 30. The switch buffer circuit 40 provides the on/off switching signals required to actually drive the switches within the switching circuit 12 in response to the control signals it receives from the switching control circuit 38.

As alluded to above, the need for a plurality of modes, providing different gains or boost factors of the output voltage to input voltage, arises in a quest for efficiency that minimizes power dissipation and maximizes battery life. The batteries that power portable electronics devices, such as for example, nickel cadmium, lithium ion, or non-rechargeable alkaline batteries, lose their charge with continued use. Typically, the battery voltage $V_{BATT}$ gradually decreases over the battery's useful life or charge cycle, and then rapidly loses its remaining charge until little or no voltage is supplied. At this point, the battery must be recharged or replaced. In order to provide a regulated, constant output voltage $V_{OUT}$ to the portable device electronics, a charge pump typically boosts the battery voltage to a level higher than that required by the output, and subsequently regulates the voltage down to the required level by use of a linear voltage regulator at the output.

According to the present invention, the charge pump 10 produces a regulated output voltage $V_{OUT}$ at the desired level by regulating the battery voltage $V_{BATT}$ at its input to the charge pump 10, and boosting this predetermined voltage by a known gain factor to produce the desired output voltage. This approach yields numerous advantages over prior art output regulated charge pumps, as will be further explicated herein.

If the charge pump 10 were to be operated in a single mode, to provide power as the battery voltage decreases throughout its useful life, a relatively large gain would be required, with the relatively high voltage output of a fresh or fully charged battery being severely regulated down to a low level. This would be very inefficient. Rather, to provide efficient power regulation throughout the range of voltages generated by the battery, it is known to utilize a multi-phase approach, employing charge pumps of greater gain as required as the battery voltage $V_{BATT}$ decreases.

Figure 5:
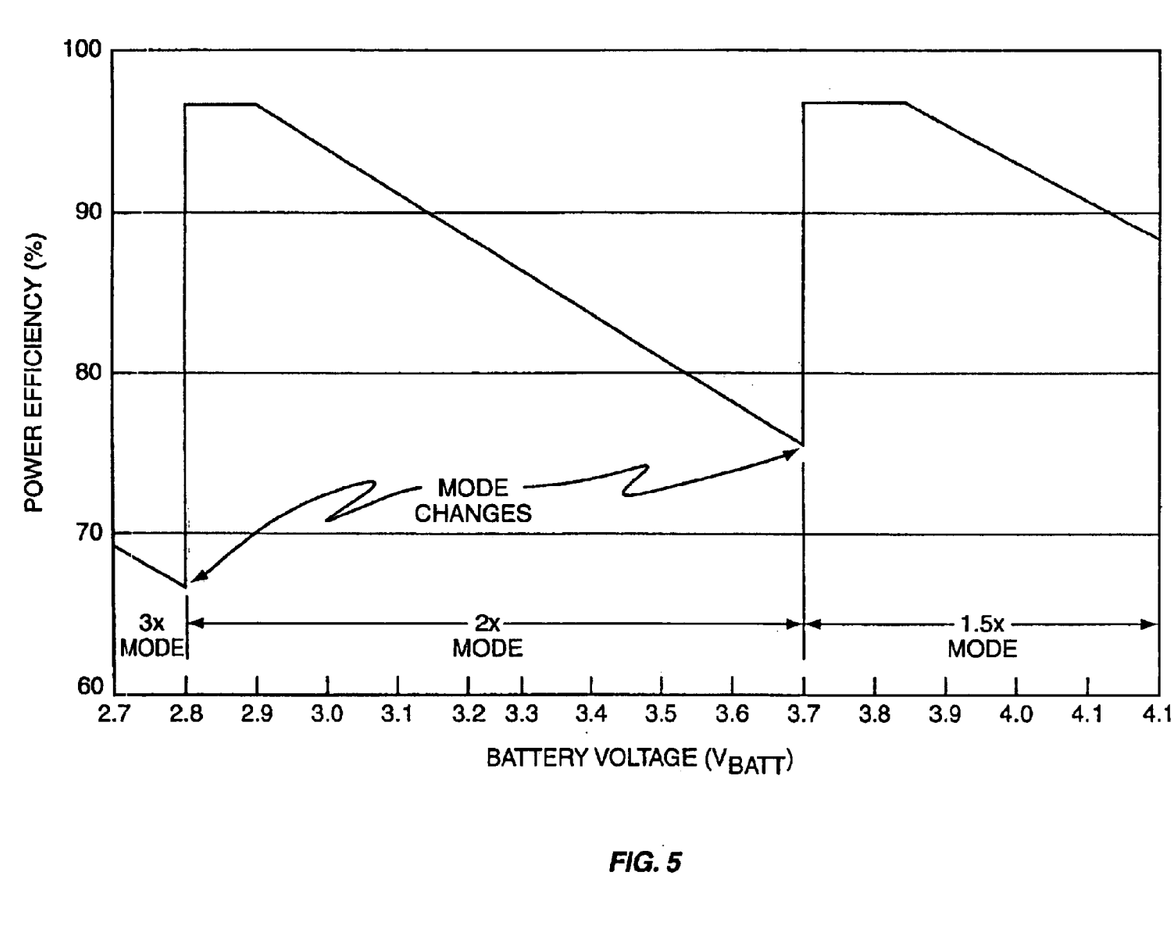
FIG. 5 is a graph of the efficiency of a multi-mode charge pump switching power supply over a range of battery voltages.

FIG. 5 shows a graph of power efficiency of the charge pump 10 over a subset of a typical battery's output voltage. The battery voltage decreases from right to left along the abscissa axis of this graph as the battery's charge is used during operation of the electronic device. The ordinate axis of the graph depicts the efficiency of the charge pump 10. As depicted in FIG. 5, in the region at the right of the graph, the charge pump 10 is in a 1.5× gain mode (the configuration depicted in FIG. 3A). To provide, in the example depicted in FIG. 5, a nominal 5.5 V output with a 1.5× gain, the input to switching circuit 12 should be approximately 3.7 V. At battery voltages higher than 3.7 volts, a voltage regulator within the input circuit 16 regulates the battery voltage down to the required approximately 3.7 volts. When the battery voltage greatly exceeds 3.7 V, the efficiency of charge pump 10 suffers, as power is lost due to the input regulation.

As the battery voltage decays to within the range of 3.7 volts, the charge pump 10 achieves its maximum efficiency, as the voltage regulator of the input circuit 16 passes the 3.7 V directly to the switching circuit 12 to be boosted to the output. However, as the battery voltage continues to drop below 3.7 V, a boost of 1.5× cannot produce the required output of 5.5 V. Thus, a stronger gain mode of charge pump 10 is required, and the control circuit 14 will actuate switches within the switching circuit 12, configuring the charge storage capacitors C1 and C2 into the 2× mode (as depicted in FIG. 3B). At this point, the relatively high voltage, e.g., 3.6 V, when doubled, would exceed the nominal required output of 5.5 V.

The input voltage is thus regulated down by input circuit 16 to approximately 2.8 V. The drop in the graph of FIG. 5 to the left of $V_{BATT}$=3.7 V shows the inefficiency due to the power lost in this voltage regulation. As the battery voltage continues to drop, the efficiency of charge pump 10 gradually increases as the required regulation decreases, reaching its maximum efficiency as the battery voltage approaches 2.8 V. Similarly, as the battery voltage decays below 2.8 volts, the switching circuit 12 is configured to a 3× gain mode (not shown), and the available battery voltage is regulated down to approximately 1.8 V by the input circuit 16. In this manner, a multi-mode charge pump 10 can provide a regulated output voltage $V_{OUT}$ over a wide range of battery voltages $V_{BATT}$ while maintaining a relatively high efficiency.

During the changes between modes of the multimode switching circuit 12, various undesirable effects may be manifest. For example, when switching from the 1.5× to the 2× mode, large transient currents may be induced through the $V_{IN}$ node to the switching circuit 12. Considering FIG.

3A, at the end of phase A, charge storage capacitor C1 will be charged to $V_{IN}$, and capacitor C2 will be at ½ $V_{IN}$. During steady state conditions, the same charge is across the capacitors at the end of phase B. Upon switching to the 2× mode, as depicted in FIG. 3B, the phase A configuration is the same as the phase A configuration of the 1.5× mode, i.e., capacitor C1 at $V_{IN}$ and capacitor C2 and ½ $V_{IN}$. Upon switching to phase B of FIG. 3B however, capacitor C2, with a charge of ½ $V_{IN}$, will attempt to rapidly charge to $V_{IN}$, resulting in a large current flow through the input node to capacitor C2.

This undesired large transient current may pull down the output voltage of the battery $V_{BATT}$, induce noise into the system, and dissipate excessive power. According to the present invention, and as is more fully explicated herein, the input circuit 16 of charge pump 10 may include current limiting capability, thus sensing excessive currents at the $V_{IN}$ node and limiting current from the battery to an acceptable level. This allows for a smoother transition between gain modes, as the charge storage capacitors C1 and C2 charge to their new values over the course of several phase changes.

The output voltage $V_{BATT}$ of the battery, while generally decreasing over time, does not do so in a strictly linear or even predictable manner. Environmental factors such as ambient temperature and humidity, transients in the load, and the operation of battery recharging circuits may all contribute to an increase in the output of battery voltage $V_{BATT}$. If this increase in battery voltage occurs near a mode switching point, the charge pump 10 may need to switch from a higher gain mode to a lower gain mode. Referring again to FIGS. 3A and 3B, consider the case where the charge pump 10 switches from the 2× mode of FIG. 3B to the 1.5× mode of FIG. 3A. In a steady state condition and with no load applied, the node at the positive side of the storage capacitor C2 is charged to $V_{IN}$, and the node at the positive side of storage capacitor C1 is charged to $2V_{IN}$. Upon switching to phase A of the 1.5× mode as depicted in FIG. 3A, $V_{OUT}$ remains at $2V_{IN}$, as this is the same configuration as phase A of the 2× mode. Upon switching to phase B of the 1.5× mode, however, capacitor C2 places a $2V_{IN}$ charge on the input node that is at voltage level $V_{IN}$. This reverse biases the input node, and without protection will cause current to flow from the charge pump 10 into the battery 26, potentially damaging the battery and pulling down the output voltage of the charge pump 10. To prevent this condition, the voltage regulator in input circuit 16 may additionally serve as an isolation switch to remove the $V_{IN}$ node of switching circuit 12 from the output of the battery 26. The input circuit 16 also outputs a reverse bias detection signal so that the control circuit 14 may additionally open switches within the switching circuit 12 to further isolate the charge storage capacitors from the input.

Figure 6:
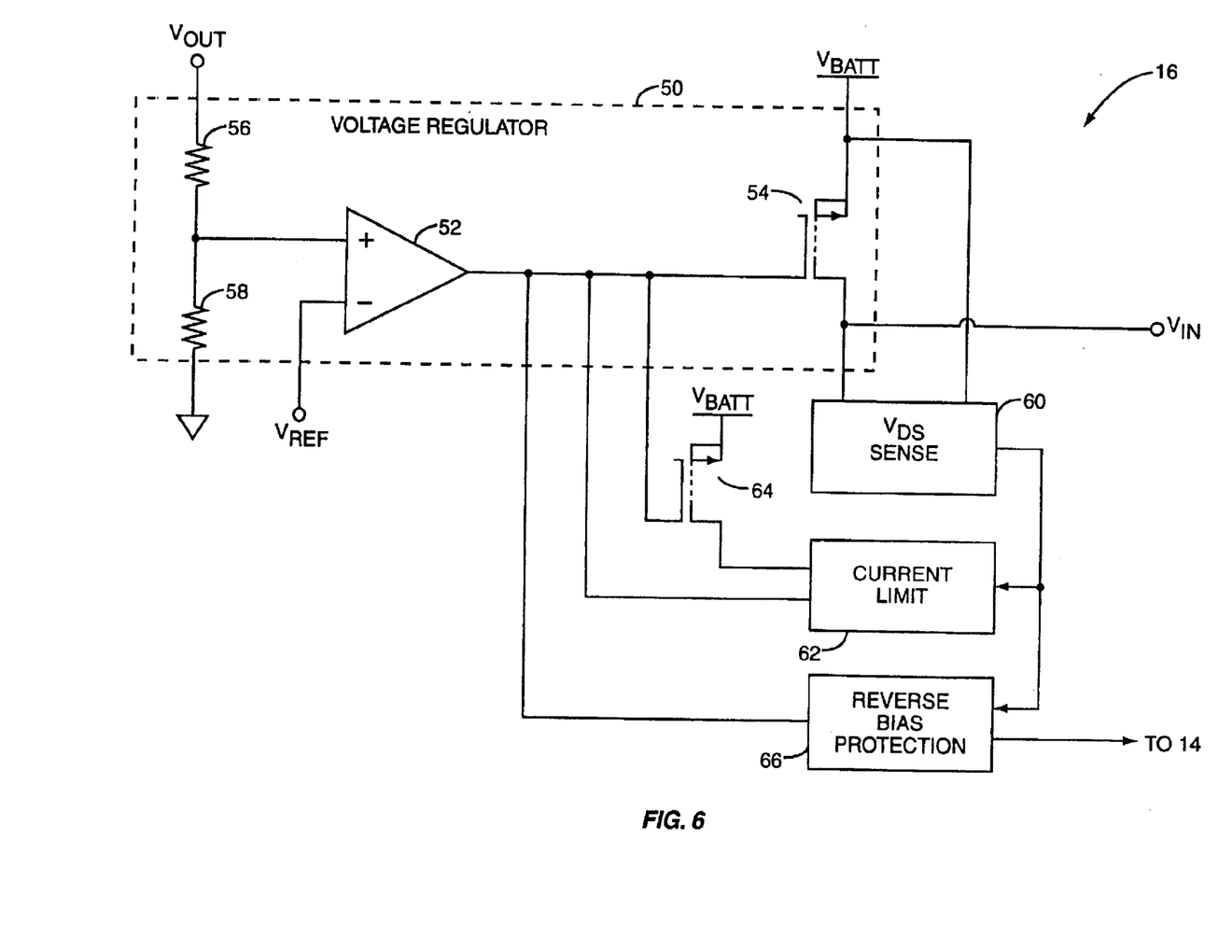
FIG. 6 depicts an input voltage regulator, with current limiting and reverse bias input circuits.

The input circuit 16 is depicted in FIG. 6. The input circuit 16 comprises a voltage regulator 50, a differential voltage sensor 60, a current limit circuit 62 and its associated reference transistor 64, and a reverse bias protection circuit 66. In this exemplary embodiment, the input circuit 16 is disposed between the output of the battery 26 and the input node of the switching circuit 12. However, at least some of the various functions of the input circuit, such as its current limiting function, may be distributed elsewhere within the charge pump 10.

Voltage regulator 50 compares the output voltage $V_{OUT}$ of the switching circuit 12 to a reference voltage $V_{REF}$. The regulator 50 regulates the battery voltage $V_{BATT}$ such that the input voltage $V_{IN}$ provided to the switching circuit results in the desired output voltage $V_{OUT}$. The voltage regulator 50 comprises an amplifier 52, a pass transistor 54, and resistors 56 and 58. The resistors 56 and 58 form a voltage divider that provides a fraction of the $V_{OUT}$ voltage to one input of the amplifier 52. The amplifier 52 generates an error signal based on a difference between a reference voltage $V_{REF}$ applied to the other input of the amplifier and the output from the voltage divider.

By driving the gate of the pass transistor with this error signal, the pass transistor 54 is maintained at a gate bias that maintains $V_{IN}$ at a voltage resulting in the desired value of $V_{OUT}$. The output of the charge pump 10 is thus continuously and automatically regulated to the desired output level $V_{OUT}$ by operation of voltage regulator 50.

Regulating the input voltage $V_{IN}$ to the switching circuit 12 presents several advantages over the prior art practice of regulating the output voltage $V_{OUT}$. By regulating the input voltage, proportionally smaller voltages need to be regulated down than at the output of charge pump 10, particularly for large gain modes of the switching circuit 12. This results in the voltage regulator 50 operating with lower voltage differentials between $V_{BATT}$ and $V_{IN}$. Additionally, increasing integration, decreasing size, and reduced power consumption of modern integrated circuits results in smaller feature size, i.e., reduced size of the transistors and other components formed in the integrated circuit die. These smaller geometries, although faster and dissipating less power, are more susceptible to damage from high voltages. Specifically, the switches comprising the switching circuit 12 may be formed from Field Effect Transistors (FETs) or similar structures on an integrated circuit. FETs can only withstand certain maximum voltages, dependent on feature size and process technology, across their switching terminals, i.e., from the drain to source nodes, denoted $V_{DS}$. Voltages exceeding a maximum permissible $V_{DS}$ may permanently damage the integrated circuit, rendering the charge pump 10 inoperative. Thus, regulating the battery voltage $V_{BATT}$ down to known values before applying it to the input node of the switching circuit 12 ensures that excessive $V_{DS}$ voltages do not appear across the FET switches. This is of particular concern when switching from one gain mode to a relatively higher gain mode, when the battery voltage $V_{BATT}$ is at its highest value for the higher gain mode range.

The pass transistor 54 can also serve as an isolation switch, isolating the battery 26 from the switching circuit 12 during reverse bias conditions that can arise as the charge pump 10 changes operating modes. The reverse bias condition arises when one of charge storage capacitors associated with the switching circuit 12 is connected to the $V_{IN}$ input node of the switching circuit 12 when it charged to a voltage level higher than $V_{BATT}$. This type of condition might exist momentarily, for example, when changing from a 2× mode to a 1.5× mode. FET devices, with their low on-resistance, are ideal for use as the pass transistor 54. However, practical FET devices often include a parasitic diode between their drain and source that would allow current to flow from the $V_{IN}$ connection back to the $V_{BATT}$ connection whenever $V_{IN}$ exceeded $V_{BATT}$. Thus, the $V_{DS}$ sense circuit 60 senses the drain-source voltage across the pass transistor 54 to detect such reverse bias conditions.

The $V_{DS}$ sense circuit, which may be implemented as a differential amplifier, provides a control signal to the reverse bias protection circuit 66. The reverse bias protection circuit 66 turns off the pass transistor 54, and asserts a control signal to the control circuit 14, causing the control circuit 14 to control the switching circuit 12 to disconnect its associated charge storage capacitors 18 or 20 from the $V_{IN}$ input node. Alternatively, the control signal may be asserted directly to the switching circuit 12. Controlling the switching circuit 12 in this manner avoids having one of the capacitors 18 and 20 from discharging into the battery 26 back through the parasitic diode of the pass transistor 54.

Reverse current may also be limited when transitioning from a relatively stronger gain mode to a relatively weaker one by the control circuit 14 forcing the switching circuit 12 to remain in the "charge" phase (i.e., phase A as depicted in FIGS. 3A and 3B). This maintains constant current flow to the output, and additionally assists transition to the weaker gain mode by charging the charge storage capacitors as required for the new mode. The switching circuit 12 may be forced to remain in charge mode by the control circuit 14 immediately upon changing modes, based on knowledge of the mode change. Additionally, the control circuit 14 may force the switching circuit 12 into the charge phase for a given mode whenever the reverse bias condition is detected.

The pass transistor 54 additionally may limit the current passing through the $V_{IN}$ node to switching circuit 12. Current limiting may be indicated, for example, when large load transients attempt to draw excessive current from the charge pump 10, or to limit transient currents when switching modes, as described above. The reference transistor 64 is configured with a known geometry relative to the pass transistor 54 and controlled such that it has the same drain-to-source differential voltage as the pass transistor 54. The current limit circuit 62 effects this drain-to-source voltage control responsive to the control signal provided by the $V_{DS}$ sense circuit 60. With the same drain-to-source voltage and same gate bias as the pass transistor 54, the current through the reference transistor 64 has a known relationship to the current through the pass transistor 54.

Sensing when the current through the reference transistor exceeds a given threshold allows the current limit circuit 62 to effectively sense when the current through the pass transistor 54 exceeds a proportional threshold. Thus, the current limit circuit 62 may be set to limit the current through the pass transistor 54 to a desired maximum value. When the current through the pass transistor 54 approaches this maximum value, the current limit circuit 62 controls the gate of the pass transistor to limit current to the maximum value.

Additionally, when transitioning from a relatively weaker gain mode to a relatively stronger gain mode, the control circuit 14 may decrease the response time of the current limiting function of the input circuit 16 by precharging the current limiting circuit 62. The output of the current limiting circuit 62 sources current to the gate of the pass transistor 54, to limit current through transistor 54. Based on the pending mode transition, the control circuit 14 may predict large transient currents, and force the current limiting circuit 62 to bias the drain of transistor 54 into current limiting mode in advance of the mode change. Thereafter, the current limiting circuit 62 monitors current through the reference transistor 64 and controls the corresponding current through transistor 54, as described above.

Many other techniques for controlling current in the charge pump 10 may occur to one of ordinary skill in the art. For example, current may be limited by restricting the on-time duration of one or more switches in the switching circuit 12 during each phase. Alternatively, particularly for implementations utilizing MosFET switches, the gate to source voltage of one or more switches may be controlled, such that the switch is not fully "on." Additionally or alternatively, the slew rates on the switching transitions may be lengthened.

Thus, while the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the spirit and scope of the invention. The present embodiments are therefore to be construed in all aspects as illustrative and not restrictive and all changes coming within the meaning and equivalency range of the appended claims are intended to be embraced therein.

What is claimed is:

1. A multimode, multiphase charge pump power supply, comprising a) an input connected to a voltage source;
   b) an output providing a regulated output voltage;
   c) a switching circuit connected between said input and said output, said switching circuit comprising a plurality of switches operable in at least two different operating modes, each operating mode comprising a plurality of phases;
   d) a control circuit to select the operating mode of said switching circuit and to generate a switching signal to alternate between said plurality of phases of the selected operating mode during a switching cycle; and
   e) said switching circuit being further operative to suppress said switching signal for at least one switching cycle following a change from a first operating mode to a second operating mode.

* * * * *